United States Patent
Honeycutt et al.

(10) Patent No.: US 9,248,628 B2
(45) Date of Patent: Feb. 2, 2016

(54) GLASS LAMINATE USING TEXTURED ADHESIVE

(71) Applicant: Southwall Technologies, Inc., Palo Alto, CA (US)

(72) Inventors: David Lee Honeycutt, Mesa, AZ (US); Matthew Coda, Menlo Park, CA (US); Lee Campbell Boman, Belmont, CA (US); Julius G. Kozak, Anitoch, CA (US)

(73) Assignee: Solutia Inc., Saint Louis, MO (US)

( * ) Notice: Subject to any disclaimer, the term of this patent is extended or adjusted under 35 U.S.C. 154(b) by 163 days.

(21) Appl. No.: 13/761,906

(22) Filed: Feb. 7, 2013

(65) Prior Publication Data

US 2014/0220286 A1  Aug. 7, 2014

(51) Int. Cl.
*B32B 17/06* (2006.01)
*B32B 3/30* (2006.01)
(Continued)

(52) U.S. Cl.
CPC ............. *B32B 17/10577* (2013.01); *B32B 3/30* (2013.01); *B32B 17/064* (2013.01); *B32B 17/10036* (2013.01); *B32B 17/10174* (2013.01); *B32B 17/10761* (2013.01); *B32B 17/10779* (2013.01); *B32B 17/10972* (2013.01); *B32B 33/00* (2013.01); *B32B 37/02* (2013.01); *B32B 38/06* (2013.01); *C09J 7/0239* (2013.01); *C09J 7/0296* (2013.01); *C09J 2459/00* (2013.01); *Y10T 428/14* (2015.01); *Y10T 428/1476* (2015.01); *Y10T 428/2457* (2015.01); *Y10T 428/24562* (2015.01); *Y10T 428/24612* (2015.01); *Y10T 428/28* (2015.01)

(58) Field of Classification Search
CPC ...... C09J 7/0203; C09J 7/0207; C09J 7/0285; C09J 2201/128; B32B 38/06; B32B 33/00; B32B 37/02; B32B 3/30; B32B 17/064; B32B 17/10036; B32B 17/10174; B32B 17/10577; B32B 17/10761; B32B 17/10779; B32B 17/10816; Y10T 428/24562; Y10T 428/2457; Y10T 428/24612; Y10T 428/1476; Y10T 428/28
USPC .............................................. 428/40.1, 42.1
See application file for complete search history.

(56) References Cited

U.S. PATENT DOCUMENTS 4,177,101 A  12/1979  Evans
4,385,951 A   5/1983  Pressau
(Continued)

FOREIGN PATENT DOCUMENTS

WO   WO 97/03763 A1   2/1997

OTHER PUBLICATIONS

PCT International Search Report and Written Opinion dated Apr. 22, 2014 for International Application No. PCT/US2014/012015.
(Continued)

*Primary Examiner* — Patricia L Nordmeyer
(74) *Attorney, Agent, or Firm* — Michelle Bugbee

(57) ABSTRACT

A method for laminating glass, a laminate assembly, and an adhesive-coated plastic material used in a laminate assembly. Specifically an adhesive, once applied to a plastic layer is grooved or textured to allow formerly trapped air to escape from between layers of a laminate assembly during a laminate process. This can allow for the adhesive layer to be thinner, while still providing for a final product that is relatively air bubble-free and optically pleasing or substantially free of optical defects caused by waviness of the plastic layer between two PVB sheets and/or wrinkles of the plastic sheet.

13 Claims, 2 Drawing Sheets

(51) Int. Cl.
  *B32B 33/00* (2006.01)
  *B32B 37/02* (2006.01)
  *B32B 38/06* (2006.01)
  *C09J 7/02* (2006.01)
  *B32B 17/10* (2006.01)

(56) References Cited

U.S. PATENT DOCUMENTS

| | | |
|---|---|---|
| 4,743,488 A | 5/1988 | Jones et al. |
| 4,976,805 A | 12/1990 | Ishii et al. |
| 5,091,258 A | 2/1992 | Moran |
| 5,147,485 A | 9/1992 | Gajewski et al. |
| 5,455,103 A | 10/1995 | Hoagland et al. |
| 5,536,347 A | 7/1996 | Moran |
| 5,626,809 A | 5/1997 | Mortelmans |
| 5,686,169 A | 11/1997 | Hassall et al. |
| 5,817,209 A | 10/1998 | Segal |
| 5,932,329 A | 8/1999 | Frost et al. |
| 5,942,062 A | 8/1999 | Hassall et al. |
| 6,455,141 B1 | 9/2002 | Woodard et al. |
| 6,524,675 B1 * | 2/2003 | Mikami et al. ............ 428/40.1 |
| 6,863,956 B1 | 3/2005 | Nakajima et al. |
| 6,929,864 B2 | 8/2005 | Fleming et al. |
| 2008/0254302 A1 | 10/2008 | Bourcier et al. |
| 2008/0268204 A1 | 10/2008 | Bourcier et al. |
| 2008/0286530 A1 | 11/2008 | Smith |
| 2009/0011230 A1 | 1/2009 | Rymer |
| 2010/0046078 A1 * | 2/2010 | Kirimoto et al. ............ 359/609 |

OTHER PUBLICATIONS

New Co-pending U.S. Appl. No. 14/708,793, filed May 11, 2015, Honeycutt, et al.

* cited by examiner

GLASS LAMINATE USING TEXTURED ADHESIVE

BACKGROUND

1. Field of the Invention

The present invention is in the field of laminated materials, specifically optically clear rigid materials, and more specifically to glass or plastic laminates utilizing a textured adhesive in their formation.

2. Description of the Related Art

Glass can be laminated with various plastic layers to form laminated safety glass which can be used in windshields for automobiles, windows for buildings and elsewhere. Certain types of plastic and glass can be used to form laminated safety glass that functions as bulletproof (or bullet-resistant) glass. The plastic layer in a glass laminate can have dyes or coatings to impart various optical characteristics to the resulting laminated safety glass. Examples of such optical characteristics include tinting, color, partial reflectivity, infrared reflectivity, infrared absorption, ultraviolet reflectivity, and ultraviolet absorption.

While a variety of different materials can be used as a plastic layer in laminated safety glass, polyethylene terephthalate (PET) is known for use as a plastic layer in laminated glass. Commonly, when PET is used as the plastic layer, the PET layer has an adhesive applied on one or both sides of it; the PET/adhesive layer combination is then sandwiched between two layers of glass in a laminate assembly. The adhesive in such arrangements, applied on at least one side of the PET layer, is often in the form of a preformed poly(vinyl butyral) (PVB) sheet; the PET and PVB layers are stacked on top of each other, with the glass layers then placed external to the PET and PVB layers and the whole stack of PET, PVB and glass layers being laminated.

In order to deal with the issue of air removal in various forms of interlayers, such as those which utilize poly(vinyl butyral) (PVB) sheets as one (or more) adhesive layer(s), the PVB sheets are often embossed with a series of repeating troughs or other patterns, such as, but not limited to, those described in United States Patent Application Publication No. 2008/0268204, or are formed to have various random patterns, such as, but not limited to, those described in United States Patent Application Publication No. 2008/0254302, both of which disclosures are incorporated herein by reference in their entirety.

These adhesive sheets, however, are generally relatively thick, on the order of 1 mm (1000 microns). Thick layers of PVB are generally necessary to allow for sufficient texturing to be applied to the PVB sheet to allow for air flow during de-airing processes and so that the material of the PVB sheet can absorb some of the residual air trapped between layers, further decreasing the size and number of air bubbles in the final glass laminate product.

However, one problem with the use of textured PVB sheets as the adhesive is that, although variations in the thickness of the sheet during the lamination process (i.e., variations associated with the surface roughness of the sheet) may help resolve or address the air bubble issue, such variations can add optical distortion to the laminated safety glass because the variations in the PVB sheet can translate into variations appearing in the resultant glass laminate structure. In effect, if the surface roughness of the PVB sheet does not sufficiently "flow" so that air space is removed and the resultant surface, after lamination, is essentially smooth and flat, the surface roughness (and/or differences in thickness) can be visible as optical distortion. An additional problem associated with a laminate comprising a PET layer between two PVB sheets is the formation of another type of optical distortion referred to as waviness or orange peel. When PET is laminated between two layers of PVB, the PET does not "flow" like the PVB does, so it may look wavy or appear to have a surface that looks like applesauce when laminated, even if there is excellent deairing of the laminate. Another problem associated with a laminate comprising a PET layer between two PVB sheets is the formation of wrinkles, particularly with complex curvature laminates such as windshields.

Therefore, it has generally been considered desirable to use a thinner layer of adhesive in order to decrease optical distortion from variations in the thickness of the adhesive and the use of two thicker layers of adhesive (i.e., two PVB sheets). Further, a thinner layer of adhesive allows a plastic layer to more closely follow the contours of curved glass in certain glass laminates and decrease or eliminate folding or wrinkling of the plastic layer or the adhesive layer during the lamination process, as well as a reduction or elimination of the waviness or applesauce effect of the plastic sheet and reduction or elimination of wrinkles PVB sheets, however, often cannot be made much thinner as they cannot hold surface texturing and may be difficult to work with when they are thinner.

For example, U.S. Pat. No. 6,455,141, the entire disclosure of which is herein incorporated by reference, provides for a smooth thin layer of an adhesive, such as PVB, to be applied to one surface of the plastic sheet. This layer is not provided as a preformed PVB sheet, but is provided as deposited material which is laid down directly on the plastic sheet to form a smooth layer already attached to the plastic layer prior to lamination. Such a thin layer allows for improvements in optical issues associated with curvature and for reduced wrinkling, but is less able to absorb residual air trapped between layers of the glass laminate. In other words, previous efforts have fallen short in simultaneously resolving both the optical distortion issues described above along with the air bubble issue.

SUMMARY

A method for laminating glass, a laminate assembly, and an adhesive-coated plastic material used in a laminate assembly and in such a method are disclosed herein. Specifically, in an embodiment, the adhesive, once applied to the plastic layer is grooved or textured to allow formerly trapped air to escape from between layers of a laminate assembly during a laminate process. This can allow for the adhesive layer to be thinner, while still providing for a final product that is relatively air bubble-free and optically pleasing or substantially free of optical defects caused by waviness of the plastic layer between two PVB sheets and/or wrinkles of the plastic sheet.

Described herein, among other things, is an adhesive-coated plastic material used for forming laminated glass, the material comprising: a flexible plastic film having two opposing sides; and a first layer of adhesive applied to at least one of said two opposing sides, said first layer of adhesive having a thickness in a range of 10 to 50 microns and further having a plurality of grooves, the grooves having respective widths in a range of 20 to 100 microns and respective depths in a range of about 10 to 50% of the thickness of the first layer of adhesive.

In an embodiment of the adhesive-coated plastic material, the grooves include a first plurality of grooves parallel to each other at a first groove spacing in a range of 0.1 to 10 millimeters and a second plurality of grooves parallel to each other at a second groove spacing in a range of 0.1 to 10 millimeters, with the first plurality of grooves being approximately perpendicular to the second plurality of grooves in a grid arrangement.

In an embodiment of the adhesive-coated plastic material, the flexible plastic film includes an optical coating on at least one of said two sides of the flexible plastic film.

In an embodiment of the adhesive-coated plastic material, the first layer of adhesive is applied to the anti-infrared coating.

In an embodiment of the adhesive-coated plastic material, the first layer of adhesive comprises polyvinyl butyral.

In an embodiment of the adhesive-coated plastic material, said plastic film comprises polyethylene terephthalate.

In an embodiment the adhesive-coated plastic material further comprising a release liner releasably attached to the outer surface of the first layer of adhesive and having a plurality of protrusions conforming to the plurality of grooves.

In an embodiment of the adhesive-coated plastic material, the grooves have a spacing in a range of 0.1 to 10 millimeters.

There is also described herein, in an embodiment, a laminate assembly comprising: a flexible plastic film having two opposing sides; and a first layer of adhesive applied to one of said two opposing sides, said first layer of adhesive having a thickness in a range of 10 to 50 microns and further having a plurality of grooves, the grooves having respective widths in a range of 20 to 100 microns and respective depths in a range of about 10 to 50% of the thickness of the first layer of adhesive; a sheet of adhesive positioned adjacent a second of said two opposing sides; a first layer of glass positioned adjacent to the first layer of adhesive with the grooves of the first layer of adhesive facing towards the first layer of glass; and a second layer of glass positioned adjacent to the sheet of adhesive.

In an embodiment of the laminate assembly, the plurality of grooves includes a first plurality of grooves parallel to each other at a first groove spacing in a range of 0.1 to 10 millimeters and a second plurality of grooves parallel to each other at a second groove spacing in a range of 0.1 to 10 millimeters, with the first plurality of grooves intersecting the second plurality of grooves at an approximately perpendicular angle in a grid arrangement.

In an embodiment of the laminate assembly, the flexible plastic film comprises polyethylene terephthalate.

In an embodiment of the laminate assembly, the first layer of adhesive includes polyvinyl butyral.

In an embodiment of the laminate assembly, the sheet of adhesive has a thickness in a range of 0.5 to 1.5 millimeter.

In an embodiment of the laminate assembly, the laminate is generally wrinkle free and has a compressive strain factor (CSF) greater than or equal to 0.5

There is also described herein, in an embodiment, a method for forming a laminate assembly comprising: applying a first layer of adhesive to a first side of a flexible plastic film, creating an adhesive-coated material; after applying the first layer of adhesive, texturing the first layer of adhesive with a plurality of grooves; positioning a first glass layer adjacent the first layer of adhesive; applying a second layer of adhesive on an opposed second side of the flexible plastic film; and positioning a second glass layer adjacent to the second layer of adhesive; creating a laminate assembly wherein the laminate assembly includes the first glass layer, the first layer of adhesive, the flexible plastic film, the second layer of adhesive and the second glass layer; and vacuum de-airing the laminate assembly.

In an embodiment of the method, vacuum de-airing the laminate assembly includes: vacuum de-airing the laminate assembly at a first temperature in a range of 10 to 25 degrees C.; and vacuum de-airing the laminate assembly at a second temperature in a range of 90 to 110 degrees C.

In an embodiment, the method further comprises applying steam and pressure in a range of 150 to 200 pounds per square inch and at a temperature in a range of 100 to 140 degrees C. to the laminate layers assembly after the vacuum de-airing.

In an embodiment of the method, the second layer of adhesive has a thickness in a range of 10 to 50 microns and a further plurality of grooves having widths in a range of 20 to 100 microns and depths in a range of about 10 to 50% of the thickness of the second layer of adhesive.

In an embodiment of the method, the flexible plastic film comprises polyethylene terephthalate.

In an embodiment of the method, at least one of the first layer or second layer of adhesive comprises polyvinyl butyral.

In an embodiment, the method further comprises applying an optical coating on one side of the flexible plastic film prior to applying the first and second layers of adhesive.

In an embodiment of the method, texturing the first layer of adhesive includes passing the adhesive-coated material between a textured roller and a further heated roller.

In an embodiment of the method, texturing the first layer of adhesive includes using two rollers to press together a textured release liner and the adhesive-coated material.

In an embodiment of the method, the plurality of grooves includes a grid arrangement of the grooves.

DESCRIPTION OF PREFERRED EMBODIMENT(S)

Figure 1:
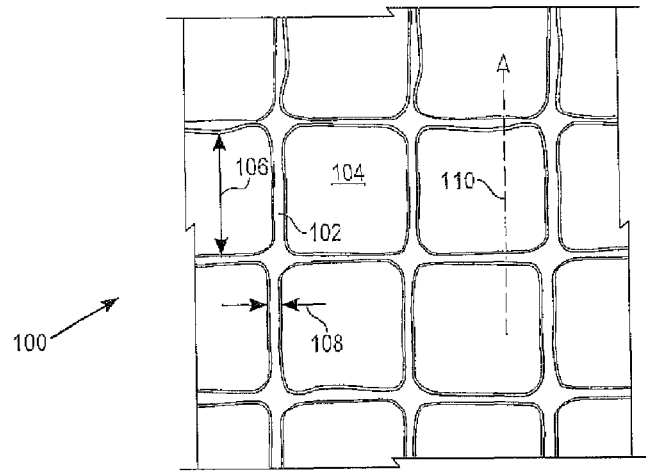
FIG. 1 is an overhead view of an exemplary pattern of groove textures for an adhesive layer, as used in an embodiment of an adhesive-coated plastic material applicable to glass laminate.
Figure 2:
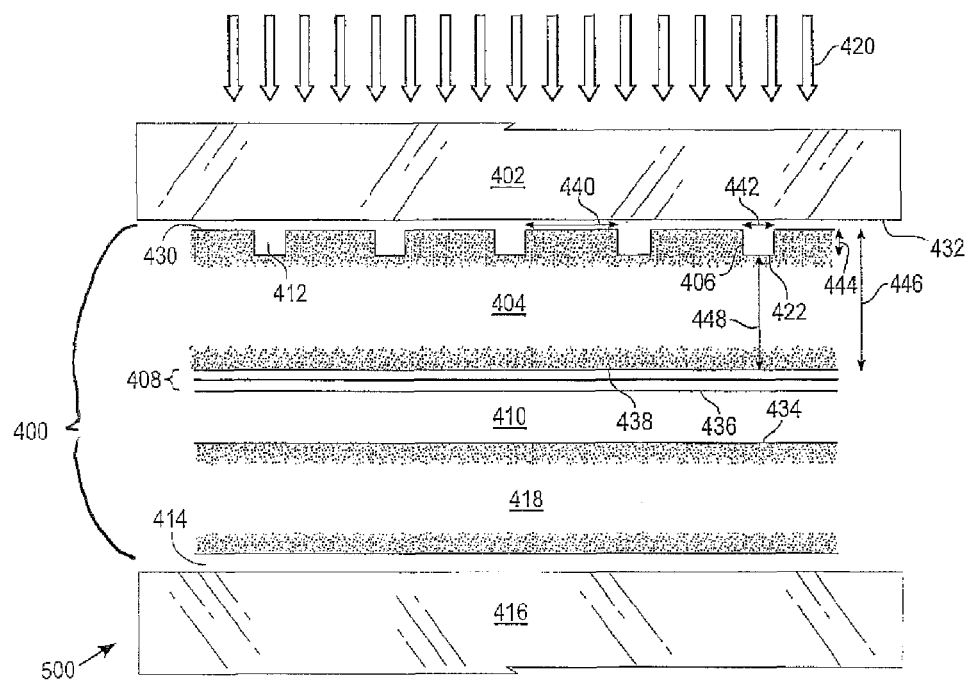
FIG. 2 is a cross-sectional view of a laminate assembly including an adhesive-coated plastic material having an optical coating, and two glass layers.
Figure 3:
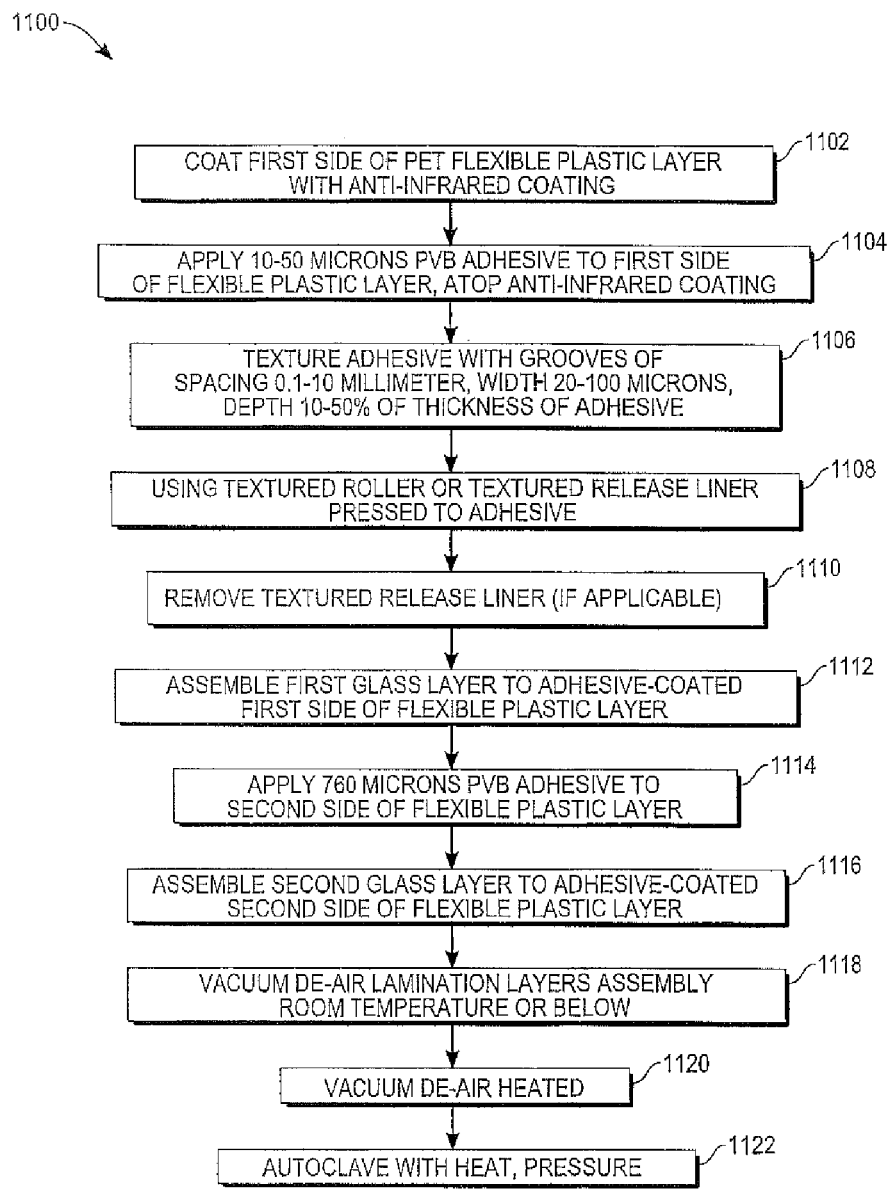
FIG. 3 is a flow diagram of a method for laminating glass. The method uses an adhesive-coated plastic material, with grooves texturing the adhesive, as shown in FIGS. 1 and 2.

With reference to FIGS. 1-3, an adhesive-coated plastic material (400), a laminate assembly (500) and a method (1100) for laminating glass are presented herein, all of which use a pattern (100) of grooves texturing a thin adhesive layer. The grooves generally allow formerly trapped air to escape during a lamination process, which results in a glass laminate, such as used for safety glass, that is essentially free of macroscopically visible air bubbles even in a thin adhesive layer. Feature sizes in the drawings are exaggerated for emphasis, and are not shown to scale.

Embodiments of the adhesive-coated plastic material, laminate assembly and method for laminating glass can be used to form glass laminates, including laminated safety glass, having any shape, including but not limited to, flat and complex curved shapes. The adhesive-coated plastic material, laminate assembly and method for laminating glass is especially useful in complex curved shapes, such as windshields with complex curvature.

With reference to FIG. 2, an embodiment of a laminate interlayer makes use of a textured, adhesive-coated plastic material to form a safety glass product after further processing as will be shown. The laminate interlayer comprises at least three layers and may comprise multiple other layers, as shown in FIG. 2. In its simplest form, the laminate interlayer comprises a flexible plastic film (410) with a thin, textured first layer of adhesive (404) applied on a first side (436) of the flexible plastic film (410), and a second layer of adhesive (418) on the opposing side of the flexible plastic film (410). In another embodiment as shown in FIG. 2, the flexible plastic film (410) has an optical or other coating (408) applied on the first side (436) of the flexible plastic film (410). The optical coating (408) is, therefore, positioned between the first layer of adhesive (404) and the flexible plastic film (410), or, equivalently, the first layer of adhesive (404) is applied atop the optical coating (408) and thereby atop the first side (436) of the flexible plastic film (410).

In an embodiment, the optical coating (408) is a multilayer stack of alternating dielectric and metal layers and serves to provide infrared-absorbing and/or infrared-reflecting characteristics. In further embodiments, the optical coating (408) is omitted, further optical coatings (408) can be applied, and/or one or more optical coatings (408) can be on either or both of the sides of the flexible plastic film (410). The coating (408) can be considered as included in the flexible plastic film (410), or can be considered as added to the flexible plastic film (410). In either case, the first layer of adhesive (404) is considered attached to, bonded to, or otherwise positioned on the flexible plastic film (410) regardless of whether it is in immediate contact with the film (410) or the coating (408).

In the embodiment depicted in FIG. 2, the flexible plastic film (410) is made of or includes polyethylene terephthalate (PET), although other flexible plastic films known to one skilled in the art, such as polyethylene naphthalate (PEN), may be used. The first layer of adhesive (404) is generally preferred to be a plastic which is soluble in a volatile solvent and can be heat activated or heat curable. In an embodiment, the adhesive layer is a thermoplastic. Poly(vinyl butyral) (PVB), which may or may not include plasticizers of any form or amount, polyurethane, ethylene vinyl acetate polymers, and similar materials are all suitable as an adhesive. In the depicted embodiment, the adhesive comprises PVB. The second layer of adhesive (418) may comprise a similar material to that of the first layer of adhesive (404) or, as shown in the depicted embodiment, may comprise a preformed PVB sheet structure.

In an embodiment, an active device or other device may optionally be included if desired. Examples of devices include solar cells, photovoltaic cells, decorative items, and other devices known to one skilled in the art for use in laminated glazings. The device may be included between a glass layer (402) or (416) and the adhesive layer (404) or (418) (referred to herein as an "adhesive/glass interface"). In some embodiments, a device may be included between both adhesive/glass interfaces.

The use of a flexible plastic film (410), and a thinner first layer of adhesive (404) results in the disclosed embodiments generally being more usable in curved glass such as curved windshields. As curved glass applications require that the adhesive-coated plastic material is able to follow the curves of the glass to which it is to be applied, the thicker such adhesive-coated plastic materials are, the harder it is for them to track the glass surface without wrinkling.

In laminates with complex curvature, such as complex curvature windshields, the use of flexible plastic film (410), and a thinner first layer of adhesive (404) results in the disclosed embodiments generally being more usable in curved glass having highly cross-curved design. Windshields have three-dimensional curvature, and it is difficult to provide a wrinkle free laminate due to wrinkling of the plastic film. This is particularly more common in the complex curvature laminates because the 'flat' material (i.e., the PET sheet) cannot conform to the spherical surface of the glass or windshield.

Previously, to provide a wrinkle free laminate using a flexible plastic film, the compressive strain factor of the windshield curvature had to be less than 0.5. Compressive strain factor (CSF) is determined, in part, by measuring the windshield's height in the Y (HY0) and Z (WZ0) directions, and the sag in the Y (measured on the Y axis, SY0) and Z (SZ0) directions of the windshield. CSF can be calculated using the formula: $CSF=Cm((SY0*SZ0)/(HY0*WZ0))$. Cm is a number value that can be measured using electronic means (such as CAD software and 3D CAD files) or other alternative methods, as known to one skilled in the art, and it is defined as the most complex cross curved point measured on a windshield surface. Using CAD software, for example, the height of the windshield is measured in the vertical direction, the width in the horizontal direction, and the most complex curved sections are determined. Cm is also defined as the maximal mean curvature (H), looking at the average cross curvature in two direction, in relation to the height and width of the windshield (that is, it looks at the most complex curvature versus the simple curvature), where $H=\frac{1}{2}(K1+K2)$, where H is the average curvature, K1 is the maximal principal curvature and K2 is the minimal principal curvature at a given point on a 3D curved surface.

Thus, by measuring the Cm, one can predict where the compressive strain is on the film, such as a metal coated reflective film, in a laminate. For previous windshields including films that were laminated without the thinner textured adhesive, the maximum compressive strain cannot exceed 0.5 before the film begins to wrinkle in the windshield. In contrast, for laminates using thinner textured adhesive according to the present invention, compressive strain greater than or equal to 0.5 is possible, meaning a higher compressive strain can be endured before film wrinkling occurs in the laminate.

The use of a flexible plastic film and a thinner, textured first layer of adhesive results in a wrinkle free laminate not previously possible in windshields having complex curvature where the compressive strain factor is 0.5 or greater, as previously described.

The first layer of adhesive (404) can be applied using a known industrial process, such as by dissolving the adhesive material (e.g., PVB resin) in a solution containing an organic solvent or forming an aqueous solution of the adhesive material, and applying that solution with a roll-to-roll slot die process, followed by evaporation of the organic solvent or water in an oven. Alternatively, the material may be applied by other coating or deposition techniques either alone, as a suspension, or dissolved in another material known to one skilled in the art. Some such deposition methodologies are discussed in U.S. Pat. No. 6,455,141, the entire disclosure of which is herein incorporated by reference.

As discussed previously, FIG. 2 provides an embodiment of a plastic film (410) which has a first layer of adhesive (404) attached thereto to form an adhesive-coated plastic material (400). The adhesive layer (404) includes grooves (406) applied thereto.

FIG. 1 shows an embodiment of a grid pattern (100) for grooves (406). The grooves (406) in the grid pattern (100) preferably have a lateral spacing (106) of about 0.1 to 10 millimeters and preferably a width (108) of about 20 to 100 microns as will be further discussed below. In one embodiment, the grooves (406) have a spacing (106) of about ½ millimeter. The grooves (406) are formed, in an embodiment, by texturing a first layer of adhesive (404) after the adhesive layer is applied to the plastic sheet (410). In the embodiment shown, the grooves (406) have a two-dimensional grid pattern (100), e.g., a square grid or rectangular grid. Alternative embodiments can have alternative or additional patterns of grooves (406), such as, but not limited to a first set of grooves intersecting a second set of grooves (406) at an angle, triangular or hexagonal grids of grooves, wavy grooves, random patterns, and so on. In a still further embodiment, a majority of all of the grooves (406) are parallel to each other. However, it will be appreciated that virtually any pattern (100) of grooves (406) can be used in various different embodiments.

While the above contemplates a range of groove sizes (412), these are not strictly required and are designed to be illustrative of a particular pattern (100). Groove sizes (412) which may be used are more limited to their performance characteristics in the selected pattern (100) than any rigid size requirements. For example, grooves (406) in a tighter grid pattern (100) may have different dimensions than grooves (406) in a larger grid pattern (100). It would be recognized that grooves (406), which are too shallow for the pattern (100), can collapse prematurely under vacuum or pressure. In effect, the grooves (406) are removed before air has had a chance to flow through the grooves (406) from within the resulting laminated glass structure. The resulting incomplete de-airing yields optical defects caused by pockets of trapped air between the glass (402) and the adhesive layer (404). Further, if the grooves (406) are too deep, the grooves (406) may not completely collapse in the lamination process which can leave visible residual patterns in the finished laminated glass. Grooves (406) which are too deep can result in localized non-planarity of the interlayer (400), such as ridges and grooves, which give rise to the herringbone or checkered pattern depending on the pattern (100) originally chosen. This undesirable optical defect is made even more visible when an optical coating (408), such as a film having infrared-absorbing and/or infrared-reflecting properties, is included in the adhesive-coated plastic material (400).

Thus, the disclosed first adhesive layer (404) thickness and groove dimensions (412) (sizes, shapes, spacing, width, depth, etc.) are provided to give an example of a pattern (100) which can reduce or essentially eliminate optical defects from trapped air or from localized non-planarity in the adhesive-coated plastic material or interlayer (400). With grooves (406) correctly dimensioned, each groove (406) is filled primarily by the ingress of adjacent adhesive material during the final states of de-airing or during a subsequent autoclave process.

The thin, textured first layer of adhesive (404) preferably has a thickness (446) in the range of about 10 to about 50 microns. This is much thinner than a one millimeter adhesive sheet (418). In further embodiments, a thicker or thinner first layer of adhesive (404) can be used. However, the thicker first layer of adhesive (404) can result in undesirable cosmetic issues in the final laminated safety glass, such as those commonly known as orange peel, applesauce and/or wrinkles. Further, a particularly thin first layer of adhesive (404), such as those with less than five microns of thickness (446), may result in a laminated safety glass which fails critical strength and impact resistance requirements as there is simply not enough adhesive power.

As shown and discussed with reference to FIG. 2, the grooves (406) in the first layer of adhesive (404) have a preferred lateral spacing (440) of about 0.1 to about 10 millimeters and a width (442) of about 20 to about 100 microns. The grooves (406), in this embodiment, preferably have a depth (444) in a range of about 10 to about 50% of the thickness (446) of the first layer of adhesive (404). Thus, a thickness (448) of adhesive remains beneath the bottom (422) of the grooves (406) in a range of about 50 to about 90% of the thickness (446) of the first layer of adhesive (404). The grooves (406) are formed in an outer surface (430) of the first layer of adhesive (404), with the outer surface (430) of the first layer of adhesive (404) being distal to the flexible plastic film (410) as shown in FIG. 2.

It should be recognized that, while the above contemplates a specific shape of groove (406), formed materials rarely comply with intended or specific shapes simply due to manufacturing limitations. While there is some variation in groove depth and shape (412), the general principles of depth and other measurement discussed herein are believed preferred when calculating a ratio of groove depth (412) to adhesive thickness (446) and (448).

The grooves (406) may be formed through multiple methods. In one embodiment, the grooves (406) are formed in the adhesive by texturing the adhesive with a textured roller. An adhesive-coated material (400), with the first adhesive layer (404) attached thereon and facing upwards, is routed beneath an infrared heater. Infrared rays from an infrared source, such as an infrared lamp, are directed by a reflector and heat the adhesive-coated material (400). The adhesive-coated material (400) passes over of the surface of a roller and is squeezed between the roller and the textured roller. Protuberances (which may be wedge-shaped or otherwise) on the textured roller are pressed into the first adhesive layer (404), forming depressions in the first adhesive layer (404), which become the grooves (406) formed in the outer surface of the adhesive layer. Separation between the rollers, known as the "nip", is adjusted and calibrated so that the desired depth of the grooves (406) in the adhesive layer (404) is achieved.

In another embodiment, the grooves (406) are formed in the adhesive by texturing the adhesive with a textured roller. An adhesive-coated material (400), with the first adhesive layer (404) attached thereon, passes over the surface of a heated roller (which heats up the adhesive) and is squeezed between the heated roller and the textured roller. Protuberances (which may be wedge-shaped or otherwise) on the textured roller are pressed into the first adhesive layer (404), forming depressions in the first adhesive layer (404), which depressions become the grooves (406) formed in the outer surface of the adhesive layer. Separation between the rollers, known as the "nip", is adjusted and calibrated so that the desired depth of the grooves (406) in the adhesive layer (404) is achieved.

In an alternative embodiment, the grooves (406) are formed in the adhesive by pressing a textured release liner into the first adhesive layer (404). An adhesive-coated material (400), with the first layer of adhesive (404) facing upwards, is routed beneath an infrared heater. Infrared rays from an infrared source, such as an infrared lamp, are directed by a reflector and heat the first layer of adhesive (404) on the adhesive-coated material (400). The adhesive-coated material (400) passes over the surface of a roller. Meanwhile, a textured release liner, with protuberances or protrusions facing upwards, is routed over the surface of a further roller. The protuberances have a shape and dimension complementary to the desired grooves in the first layer of adhesive (404). The textured release liner and the adhesive-coated material (400) are pressed together as they pass between the rollers, with the adhesive-coated side of the film facing towards the protuberances of the textured release liner. The protuberances thus press into the heated adhesive, forming the grooves. The release liner remains releasably attached to the adhesive-coated film, with the protrusions or protuberances of the release liner conforming to the grooves formed in the adhesive-coated film (400).

Sheets or rolls of adhesive-coated material (400) with a textured adhesive layer (404) and a release liner affixed can be sold as an intermediate product to makers of safety glass or other types of laminated glass. This intermediate product can be provided with or without an optical coating (408), such as an anti-infrared coating on the flexible plastic layer. In use, the textured release liner is removed from the adhesive-coated material (400) to reveal the grooves (406) prior to assembling a glass layer (402) to the adhesive layer (404) in forming a laminate assembly (500).

To assemble a pane of laminated safety glass, a first layer of glass (402) is assembled to the thin first layer of adhesive (404), with the grooves (406) of the first layer of adhesive (404) facing towards an internal face (432) of the first layer of glass (402).

A second layer of adhesive (418), generally in the range of 0.5 to 1.5 millimeters, more preferably about 1 millimeter, and in a specific embodiment 760 microns thick PVB sheet, is applied to the second side (434) of the flexible plastic film (410). The sheet of adhesive (418) may be a commercially available sheet of PVB, with a textured surface having a random texture of roughness on at least one side thereof. This textured surface will generally be arranged outward of the plastic film (410), that is, distal from the plastic film (410), and toward the second layer of glass (416). A second layer of glass (416) is assembled to the sheet of adhesive (418) in a conventional manner. As the assembly proceeds, trapped air (412) will be moved out from between the outer surface (430) of the first layer of adhesive (404) and the internal face (432) of the first layer of glass (402) and into the grooves (406).

The depicted laminate assembly (500), once arranged, includes, in order, the first layer of glass (402), the thin, textured first layer of adhesive (404) with the grooves (406) toward the first layer of glass, the optical or coating layer (408), the flexible plastic sheet (410), the second layer of adhesive (418) and the second layer of glass (416) to form a laminate assembly (500). In some embodiments, the optional device, such as an active device, is between the first layer of glass (402) and the first layer of adhesive (404), between the second layer of adhesive (418) and the second layer of glass (416), or both. Pressure (420) is then applied to the laminate assembly (500), to press together the layers. Processing of the laminate assembly (500) continues through methods such as de-airing and autoclaving as discussed further below.

It should be recognized that, while some embodiments provide for a textured adhesive layer (404) on a first side of the plastic film (410) (which can include a coating layer (408)) and a plastic sheet (418) on the second side of the plastic film (410), in alternative embodiments the plastic film (410) may have a textured adhesive layer (404) applied to both sides, may have the positions of the adhesive layer (404) and sheet (418) reversed, may eliminate the coating layer (408), may have a coating layer (408) on both sides (434) and (436) of the flexible plastic film (410), or may have an optional device between the adhesive layer (404) and glass (402) or the sheet (418) and glass (416). Examples of embodiments having two thin layers of adhesive (404) each textured with grooves (406), on opposed sides (434) and (436) of the flexible plastic film (with or without coating(s) (408)), include glass used for displays, such as glass display cases and picture frame glass, as well as liquid crystal displays (LCDs) and LCD monitors. Examples of embodiments having an optional device, such as an active device, include photovoltaic cells or modules, solar cells, glazings for architectural uses such as buildings, side laminates and sun roofs. Suitable processes for forming a laminate assembly having the textured adhesive layer on both sides are generally the same as described herein for a laminate assembly having the textured adhesive layer on one side.

The laminate assembly is next subjected to vacuum de-airing. The vacuum de-airing can be performed either by placing the laminate assembly in a vacuum bag to which vacuum is applied, or by applying a vacuum channel to the edges of the laminate assembly. Atmospheric pressure is naturally applied to the outer surfaces of the laminate assembly, either indirectly by the flexible walls of the vacuum bag when used, or directly by the exposure of the outer surfaces of the laminate assembly to ambient air pressure when the vacuum channel is used. Temperature during the de-airing is generally at room temperature or below, and in one embodiment is in a range of about 10 to about 25 degrees C. The application of a partial vacuum during the vacuum de-airing is intended to pull trapped air out through the grooves, allowing the outer surface of the first layer of adhesive to press tightly against the internal face of the first layer of glass. During this process, the grooves will generally remain relatively intact with groove spacing, groove depth and adhesive thickness remaining relatively unchanged from the original spacing, depth, and thickness as the outer surface of the adhesive conforms to the internal face of the first layer of glass.

While it is contemplated that the structure remain relatively unchanged, it is recognized that minor changes to the shape of the outer surface of the first layer of adhesive and inner surfaces of the grooves may occur as the first layer of adhesive yields to the harder internal face of the first layer of glass during the vacuum de-airing. Specifically, the ridges between grooves of the adhesive layer may begin to crush and spread out into adjacent grooves. The flexible plastic film, with included optical coating, conforms to the first and second layers of glass and is otherwise relatively unaffected as the first layer of glass presses to the first layer of adhesive and the second layer of glass presses to the second layer of adhesive, on opposed sides of the flexible plastic film.

The laminate assembly is next subjected to vacuum de-airing and heating. Temperature during the de-airing is nominally at about 100 degrees C., and in one embodiment is in a range of about 90 to about 110 degrees C. Heating will generally partially melt the first layer of adhesive making it more flowable, which then more closely conforms to the first layer of glass. As the trapped air is pulled out through the grooves by the vacuum de-airing, the flowable nature of the adhesive will result in the grooves becoming shallower such that the depth of the grooves becomes less than the original depth of the grooves prior to the application of de-airing and heat. Spacing of the grooves and thickness of the first layer of adhesive are expected to remain relatively unchanged, however, the collapse of the ridges will generally reduce the thickness by at least some amount compared to the original thickness. As the grooves become shallower, the width of the grooves may change. Specifically, the grooves may become narrower as material in the adhesive layer is effectively pulled into the groove by the vacuum. By this process, the first layer of glass becomes further bonded to the first layer of adhesive and thereby to the flexible plastic film. The flexible plastic film and the optical coating thereupon are relatively unaffected by the vacuum de-airing and heating.

The laminate assembly is next placed in an autoclave and subjected to heat and pressure. Heat and pressure are generally applied in the autoclave session by using pressurized steam in the autoclave. In one embodiment, a pressure of about 175 pounds per square inch of pressure is applied and the temperature is in a range of about 100 to about 140 degrees C. In further embodiments, the pressure is applied in a range of about 150 to about 200 pounds per square inch.

Under the applied pressure and heat to the layers of the laminate assembly, the first glass layer, the first layer of adhesive, the flexible plastic film, the second layer of adhesive and the second layer of glass finalize the bonding process and become bonded together to form laminated safety glass. The grooves will preferably become completely filled with the material of the ridges having now filled the grooves. The thickness of the first adhesive layer after the autoclave session is approximately the same as the thickness of the first adhesive layer prior to the vacuum de-airing sessions and the autoclave session (although has reduced by some amount). The grooves are no longer visible in the first adhesive layer. The vacuum de-airing sessions and the autoclave session remove essentially all macroscopically visible traces of trapped air from the first adhesive layer, leaving essentially optical defect-free laminated safety glass. In the embodiment shown, the infrared-absorbing and/or infrared-reflecting coating (also known as an "anti-infrared" coating) on the flexible plastic film adds a layer with these infrared properties to the safety glass.

With reference to FIG. 3, a method (1100) for laminating glass is shown. In a block (1102), the first side of a PET flexible plastic film (410) is coated with an infrared-absorbing and/or infrared-reflecting coating (408). In a block (1104), about 10 to about 50 microns of polyvinyl butyral adhesive are applied as the first adhesive layer (404) to the first side (438) of the flexible plastic (410), atop the infrared-absorbing and/or infrared-reflecting coating (408).

In a blocks (1106) and (1108), the adhesive layer (404) is textured with grooves (406) of spacing in a range of about 0.1 to about 10 millimeters, width in a range of about 20 to about 100 microns and depth in a range of about 10 to about 50 percent of the thickness (446) of the adhesive layer (404) using a textured roller (912) pressed into the adhesive layer (404), or a textured release liner (1026) pressed into the adhesive layer (404).

If applicable, in a block (1110) the textured release liner (1026) is removed from the adhesive layer (404). Such removal is performed prior to assembly of glass (402) to the adhesive layer (404), in the formation of a laminate assembly (500).

In a block (1112), a first glass layer (402) is positioned adjacent to the adhesive-coated first side of the adhesive-coated material (100). In a block (1114), a polyvinyl butyral sheet (418) is positioned adjacent the second side of the adhesive coated material (100). In a block (1116), a second glass layer (416) is positioned adjacent to the sheet (418).

In a block (1118), vacuum de-airing is applied to the laminate assembly (500), at room temperature or below. In a block (1120), vacuum de-airing is applied to the laminate assembly (500) with heating. The vacuum de-airing in blocks (1118) and (1120) can occur in a single session with a stepped or otherwise varied temperature or in separate de-airing sessions. In a block (1122), an autoclave, with heat and pressure, is applied to the laminate assembly (500) to produce a laminated glass product.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, and that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout.

The invention claimed is:

1. An adhesive-coated plastic material used for forming laminated glass, the material comprising:
   a flexible plastic film having two opposing sides; and
   a first layer of adhesive applied to one of said two opposing sides, wherein the first layer of adhesive comprises polyvinyl butyral, said first layer of adhesive having a thickness in a range of 10 to 50 microns and further having a plurality of grooves, the grooves having respective widths in a range of 20 to 100 microns and respective depths in a range of about 10 to 50% of the thickness of the first layer of adhesive; and
   a second layer of adhesive on an opposed second side of the flexible plastic film, wherein said second layer of adhesive comprises polyvinyl butyral.

2. The adhesive-coated plastic material of claim 1 wherein the grooves include a first plurality of grooves parallel to each other at a first groove spacing in a range of 0.1 to 10 millimeters and a second plurality of grooves parallel to each other at a second groove spacing in a range of 0.1 to 10 millimeters, with the first plurality of grooves being approximately perpendicular to the second plurality of grooves in a grid arrangement.

3. The adhesive-coated plastic material of claim 1 wherein the flexible plastic film includes an optical coating on at least one of said two sides of the flexible plastic film.

4. The adhesive-coated plastic material of claim 3 wherein:
   the first layer of adhesive is applied to the optical coating.

5. The adhesive-coated plastic material of claim 1 wherein said plastic film comprises polyethylene terephthalate.

6. The adhesive-coated plastic material of claim 1 further comprising a release liner releasably attached to the outer surface of the first layer of adhesive and having a plurality of protrusions conforming to the plurality of grooves.

7. The adhesive-coated plastic material of claim 1 wherein the grooves have a spacing in a range of 0.1 to 10 millimeters.

8. The adhesive-coated plastic material of claim 1, wherein the second layer of adhesive has a thickness in a range of 10 to 50 microns and a further plurality of grooves having widths in a range of 20 to 100 microns and depths in a range of about 10 to 50% of the thickness of the second layer of adhesive.

9. An adhesive-coated plastic material used for forming laminated glass, the material comprising:
   a flexible polyethylene terephthalate film having two opposing sides; and
   a first layer of adhesive applied to one of said two opposing sides, wherein the first layer of adhesive comprises polyvinyl butyral, said first layer of adhesive having a thickness in a range of 10 to 50 microns and further having a plurality of grooves, the grooves having respective widths in a range of 20 to 100 microns and respective depths in a range of about 10 to 50% of the thickness of the first layer of adhesive; and
   a second layer of adhesive on an opposed second side of the flexible polyethylene terephthalate film, wherein said second layer of adhesive comprises polyvinyl butyral.

10. The adhesive-coated plastic material of claim 9, wherein the second layer of adhesive has a thickness in a range of 10 to 50 microns and a further plurality of grooves having widths in a range of 20 to 100 microns and depths in a range of about 10 to 50% of the thickness of the second layer of adhesive.

11. The adhesive-coated plastic material of claim 9, wherein the second layer of adhesive has a thickness in a range of in the range of 0.5 to 1.5 millimeters.

12. The adhesive-coated plastic material of claim 9 wherein the grooves have a spacing in a range of 0.1 to 10 millimeters.

13. An adhesive-coated plastic material used for forming laminated glass, the material comprising:
- a flexible polyethylene terephthalate film having two opposing sides; and
- a first layer of adhesive applied to one of said two opposing sides, wherein the first layer of adhesive comprises polyvinyl butyral, said first layer of adhesive having a thickness in a range of 10 to 50 microns and further having a plurality of grooves, the grooves having respective widths in a range of 20 to 100 microns and respective depths in a range of about 10 to 50% of the thickness of the first layer of adhesive and a spacing in a range of 0.1 to 10 millimeters; and
- a second layer of adhesive on an opposed second side of the flexible polyethylene terephthalate film, wherein said second layer of adhesive comprises polyvinyl butyral and has a thickness in a range of in the range of 0.5 to 1.5 millimeters.

* * * * *